(12) United States Patent
Ueyama et al.

(10) Patent No.: US 6,694,810 B2
(45) Date of Patent: Feb. 24, 2004

(54) AIR FLOW METER

(75) Inventors: Kei Ueyama, Hitachinaka (JP); Izumi Watanabe, Hitachinaka (JP); Keiichi Nakada, Hitachinaka (JP); Junichi Horie, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 10/201,896

(22) Filed: Jul. 25, 2002

(65) Prior Publication Data
US 2003/0019289 A1 Jan. 30, 2003

(30) Foreign Application Priority Data
Jul. 25, 2001 (JP) .................................. 2001-224715

(51) Int. Cl.[7] ................................................ G01F 1/684
(52) U.S. Cl. ..................................................... 73/204.22
(58) Field of Search ........................... 73/204.22, 118.2, 73/204.11, 204.23, 204.21, 204.25, 204.27; 123/494

(56) References Cited

U.S. PATENT DOCUMENTS

| 6,012,432 A | * | 1/2000 | Igarashi et al. ............. 123/494 |
| 6,220,090 B1 | * | 4/2001 | Kohno et al. .................. 73/202 |
| 6,272,920 B1 | * | 8/2001 | Tank et al. ............... 73/204.22 |
| 6,336,360 B1 | * | 1/2002 | Weber ..................... 73/204.21 |
| 6,345,531 B1 | * | 2/2002 | Mueller et al. .......... 73/204.22 |

FOREIGN PATENT DOCUMENTS

| JP | 5-231899 | 9/1993 |
| JP | 9-145440 | 6/1997 |

* cited by examiner

Primary Examiner—Edward Lefkowitz
Assistant Examiner—Jewel V. Thompson
(74) Attorney, Agent, or Firm—Crowell & Moring LLP

(57) ABSTRACT

A support member where a flow amount detection element, which includes a heating resistor and electronic circuit parts for obtaining the air flow amount according to the flow amount signal detected by flow amount detection element are mounted, is cooled from both the direction of the main flow of main passage and the direction of an anti-main flow (i.e., the direction opposite to the direction of the main flow).

6 Claims, 4 Drawing Sheets

AIR FLOW METER

This application claims the priority of Japanese Patent Application No. 2001-224715, filed Jul. 25, 2001, the disclosure of which is expressly incorporated by reference herein.

BACKGROUND OF THE INVENTION

The present invention relates to a thermal type air flow meter which uses a heating resistor to measure the fluid flow rate such as an intake air flow in an internal combustion engine used, for example, for an automobile.

As a flow amount measuring device by which the intake air flow of the internal combustion engine such as automobiles is measured, a device which measures flow amount according to the heat radiation amount from a heating resistor which corresponds to flow amount, obtained by heating the heating resistor is known in general. Further, a thermal type air flow meter which measures flow amount by heating a heating resistor, and detecting the change in temperature of a temperature sensitive resistor arranged in the neighborhood of the heating resistor is also known.

Electronic circuit parts (electronic components) which drive the flow amount detection element including a heating resistor and the flow amount measuring device are mounted on the supporting substrate (support member such as circuit boards) made of electrical insulating material with large thermal conductivity such as ceramic etc.

The miniaturization of the flow amount measuring device advances with the object such as decreasing the cost and the number of parts of the flow amount measuring device. In recent years, the flow amount detection element has been mounted on the position near the electronic circuit parts. Therefore, it is easier to conduct heat to the flow amount detection element by the self-heating of the electronic circuit parts, thereby increasing the heat as a factor in measurement error.

In order to solve this problem, heat has in the past been radiated outside by putting the metallic plate on the circuit board where the electronic circuit parts are mounted and exposing a cooling wheel of the metallic plate in a fluid channel (as seen, for instance, in Japanese Patent Application Laid-Open No. 5-231899). Further, it is also known to mount the flow amount detection element on the circuit board where the electronic circuit parts are mounted. The window or the notch part is formed between the two, and the part where the electronic circuit of the circuit board is mounted and the part where the flow amount detection element is mounted thermal are thermally shielded (as seen, for instance, in Japanese Patent Application Laid-Open No. 9-145440).

In the prior art, cooling has been carried out just from one direction where air flows. It cannot suppress the heat influence on the flow amount detection element because of the low cooling efficiency. The accuracy of measurement is especially deteriorated in the miniaturized thermal type air flow meter.

Further, the influence of the heat of the main passage besides the heat influence by the self-heating of the electronic circuit parts is received in this known kind of thermal type air flow meter. Therefore, the heat influence cannot be suppressed enough, and measures of the more efficient cooling and the heat separation are needed.

The heat of the main passage is conducted to the flow amount detection element when the temperature of the fluid which flows in the inside is low though the temperature of the main passage is high, and thus the measurement error increases. For instance, although the temperature of the outside air may be low and thus the temperature of the intake air in the intake pipe also low, the intake pipe itself is warm because it receives the heat of the engine in the intake pipe for an automobile engine. Because the heat of the main passage (in this case, an intake pipe) is conducted to the flow amount detection element through the housing case and the support body of the flow amount detection element in such a state, the conducted temperature becomes the influential factor in the measurement error.

Further, the metallic plate might corrode when the metallic plate is exposed in the fluid channel as a cooling wheel in the above-mentioned prior art. Further, in practical use, mechanical strength decreases when the window or the notch part is formed in the circuit board.

SUMMARY OF THE INVENTION

An object of the present invention is to provide a thermal type air flow meter which can measure accurately the flow amount without being influenced by the self-heating of the electronic circuit parts and the heat of the main passage by cooling the route of thermal conduction to the flow amount detection element efficiently.

According to one characteristic of the present invention, a support member where a flow amount detection element including a heating resistor and electronic circuit parts are mounted is cooled from both the direction of the main flow of main passage and the direction of an anti-main flow (i.e., the direction opposite to the direction of the main flow).

Concretely, the present invention includes a housing for accommodating the electronic circuit parts mounted on the support member, and an auxiliary passage body which forms a flow path for cooling the support member by the fluid which flows in the direction of the main flow of the main passage, and an auxiliary passage with an opposite-direction passage portion where the fluid flows in the opposite direction to the direction of the main flow of the main passage. The fluid detection element mounted on the support member is provided in the opposite-direction passage portion. The auxiliary passage having a curved portion, which is usually called the curved auxiliary passage, is formed in the auxiliary passage body of the present invention.

Because the support member where the flow amount detection element including a heating resistor and electronic circuit parts are mounted is cooled from both the direction of the main flow of main passage and the direction of an anti-main flow (i.e., the direction opposite to the direction of the main flow) in the present invention, it is now possible to measure accurately the flow amount without being influenced by the self-heating of the electronic circuit parts and the heat of the main passage by cooling the route of thermal conduction to the flow amount detection element efficiently.

BRIEF DESCRIPTION OF THE DRAWINGS

These and other objects, features and advantages of the present invention will become more readily apparent from the following detailed description of currently preferred configurations thereof when taken in conjunction with the accompanying drawings wherein.

DETAILED DESCRIPTION OF THE PREFERRED EMBODIMENTS

Figure 1:
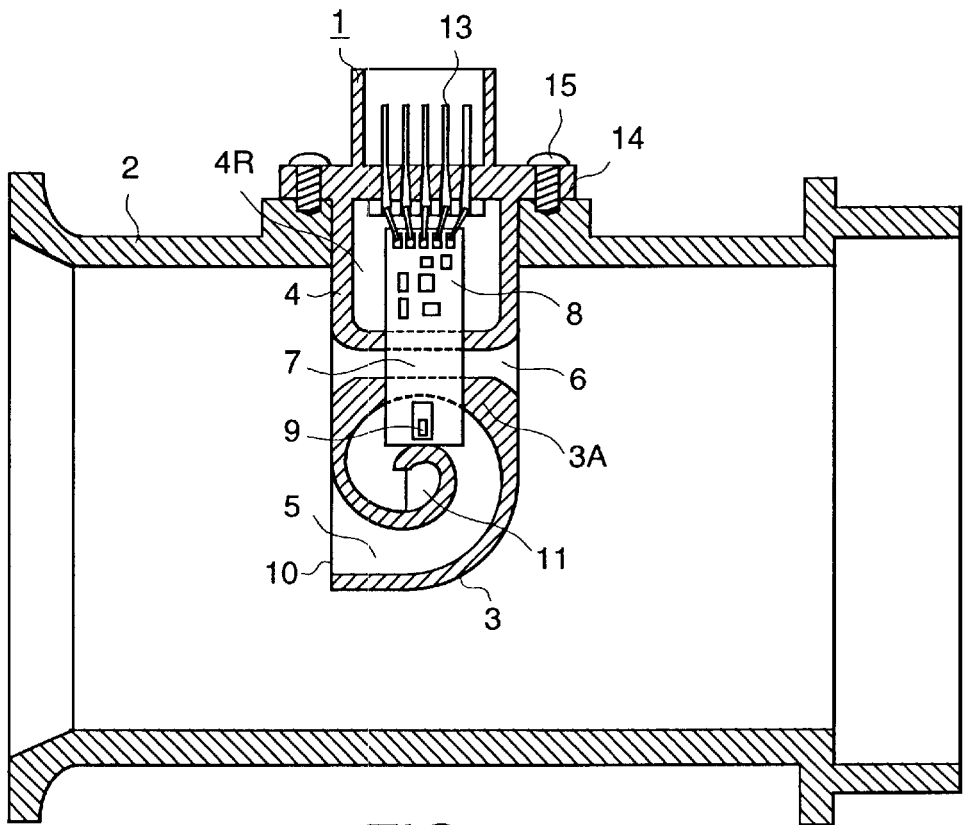
FIG. 1 is a sectional view of thermal type air flow meter according to one embodiment of the present invention.
Figure 2:
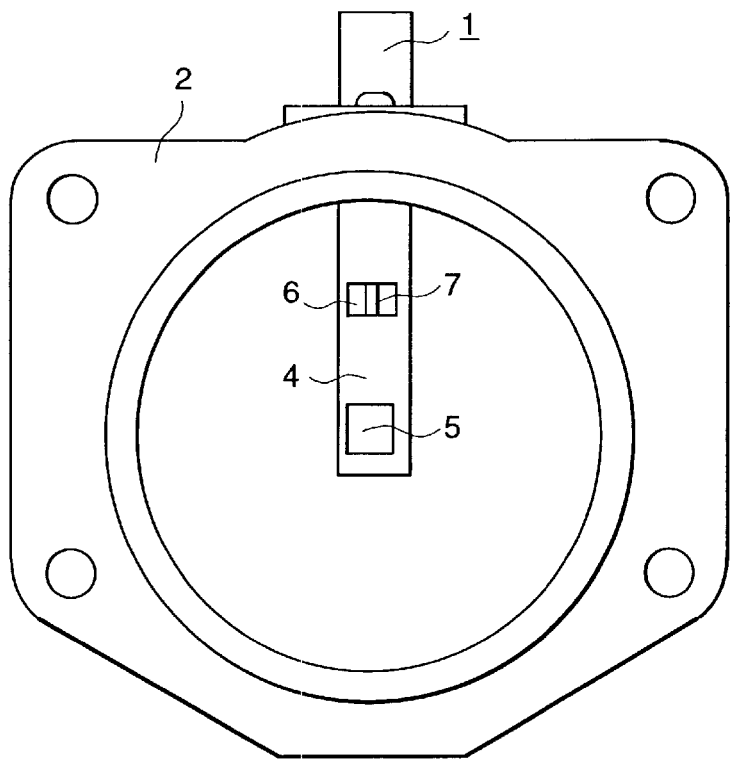
FIG. 2 is a plan view seen from the direction of the main flow of the main passage of FIG. 1.
Figure 3:
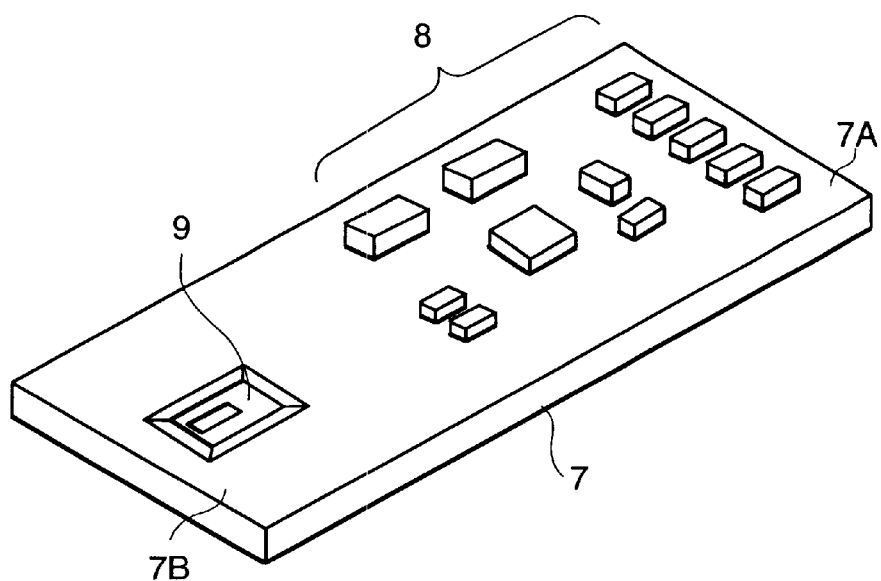
FIG. 3 is a schematic view showing one example of the support member according to the present invention.

In the embodiment shown in FIG. 1 and FIG. 2, flow amount detection element 9 including a heating resistor and electronic circuit parts 8 which composes thermal type air flow meter 1 are mounted different positions in the long direction of supporting substrate 7 (support member). The enlarged view of these components is shown in FIG. 3. Supporting substrate 7 is formed with a rectangular ceramic material, etc. Electronic circuit part 8 is mounted on one side 7A of the side of main passage body 2 in the longitudinal direction, and flow amount detection element 9 is mounted on the other side 7B. Main passage body 2 is an intake pipe, etc. of the internal combustion engine, and it is occasionally called a main passage thereafter.

Electronic circuit parts 8 mounted on supporting substrate 7 are accommodated in accommodation room 4R of housing case 4. Further, flow amount detection element 9 including the heating resistor mounted on supporting substrate 7 is arranged in spiral auxiliary passage 5 formed in auxiliary passage body 3. The flow of air in auxiliary passage 5 is swirled counterclockwise. The fluid (air) which flows in main passage body 2 flows in from entrance opening 10, and flows out from exit opening 11.

The other side 7B of supporting substrate 7 where flow amount detection element 9 is mounted is provided in the auxiliary passage part (opposite direction passage part) where the airflow flows in the direction of an anti-main flow which is the direction opposite to the direction of the main flow of the fluid which flows in main passage body 2.

Figure 4:
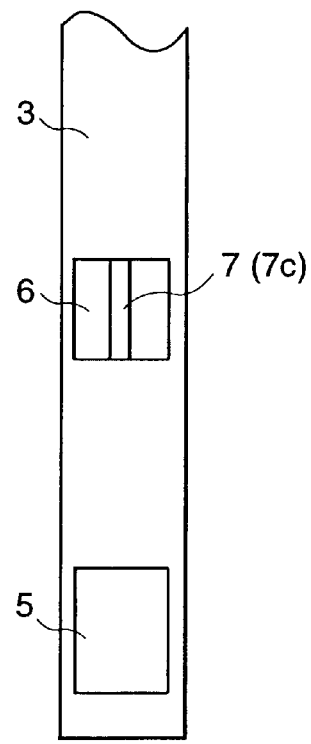
FIG. 4 is a partially broken and enlarged view showing a substantial part of FIG. 1.

Housing case 4 and auxiliary passage body 3 are molded integrally, and flow path 6 is terebrated or bored between housing case 4 and auxiliary passage body 3. Flow path 6 is a square hole terebrated in rectangular auxiliary passage body 3 almost parallel to the direction of the main flow (forward direction) of the fluid which flows in main passage body 2 as shown in FIG. 4. A part of flow path 6 of supporting substrate 7 comes to be exposed to the fluid which flows in main passage body 2.

Electronic circuit parts 8 are connected to connector 13 by a signal line. Connector 13 penetrates through flange 14. Flange 14 is formed almost like the rectangle, and the screw holes are terebrated in two corner parts. Thermal type air flow meter 1 is installed in the hole provided in main passage body 2 as shown in FIG. 1, and fixed in the screw hole of flange 14 by using screw 15 to mount on main passage body 2.

In this configuration, the fluid (air) flows in flow path 6 in the direction of the main flow of main passage body 2, and flows into spiral auxiliary passage 5 from the entrance opening 10. Flow path arrangement part 7C of supporting substrate 7 shown in FIG. 4 is cooled by the airflow flowed in the direction of the main flow.

On the other hand, the air flowed into spiral auxiliary passage 5 from entrance opening 10 is guided like a swirl and flowed out from exit opening 11. The velocity of the airflow which flows in auxiliary passage 5 is detected by flow amount detection element 9, and is input to electronic circuit parts 8 to measure the air flow rate. Because it is known well to measure the air flow rate by electronic circuit parts 8, the detailed description of that known measurement technique is omitted here.

Although the air which flows in spiral auxiliary passage 5 cools the other side 7B of supporting substrate 7, the direction of the airflow to cool the other side 7B goes in the opposite direction (i.e., the direction of an anti-main flow) to the flow direction of flow path 6 or the main flow direction of main passage body 2. Therefore, the other side 7B of supporting substrate 7 is cooled by two airflows which have flow directions that are different by about 180° from each other.

Similarly, upper wall 3A of auxiliary passage body 3 is also cooled by two airflows, the airflow which flows through flow path 6 and the airflow which flows through auxiliary passage 5, of which the flow directions are different by about 180° from each other.

Thus, the other side 7B of supporting substrate 7 where flow amount detection element 9 is cooled by two airflows, the airflow which flows through flow path 6 and the airflow which flows through auxiliary passage 5, of which flow directions are different about 180° from each other. In other words, supporting substrate 7 is cooled from both sides of the main passage upstream side and the main passage downstream side. Further, upper wall 3A of auxiliary passage body 3 is also cooled from both sides of the main passage upstream side and the main passage downstream side.

Because the flow of air which cools supporting substrate 7 in auxiliary passage 5 takes the direction opposed to the direction of the main flow of main passage 2, and flows toward the main passage upstream side from the main passage downstream side, the main passage downstream side of upper wall 3A of auxiliary passage body 3 and supporting substrate 7 are cooled efficiently.

On the other hand, because the airflow in flow path 6 flows from the same main passage upstream side as the direction of the main flow of main passage 2, the main passage downstream side of upper wall 3A of auxiliary passage body 3 and supporting substrate 7 are cooled efficiently.

Since upper wall 3A of auxiliary passage body 3 and supporting substrate 7 are cooled from both sides of the main passage upstream side and the main passage downstream side by two airflows of which flow directions are different by about 180° from each other, they are cooled very efficiently. Since upper wall 3A of auxiliary passage body 3 and supporting substrate 7 are cooled very efficiently, the heat of main passage body 2 and the heat by the self-heating of electronic circuit parts 8 are not conducted easily to flow amount detection elements 9. Thereby, the measurement error of the flow amount can be reduced, and the flow amount can be measured with a high degree of accuracy.

Further, if ceramic material instead of metal is used as the supporting substrate, it is possible to prevent corrosion even if the supporting substrate is exposed in the flow of the main passage. However, because the thermal conductivity of the ceramic material is lower than metal, the efficiency of heat dissipation worsens while the heat conducted to the flow amount detection element decreases.

Further, apparent thermal conduction in the supporting substrate improves by forming the internal conductor using the accumulating substrate for the supporting substrate, thereby improving the efficiency of heat radiation efficiency. In this case, measures such as providing the area where the wiring density of the internal conductor is small around the flow amount detection element are necessary because it should be difficult to conduct heat to the flow amount detection element.

Figure 5:
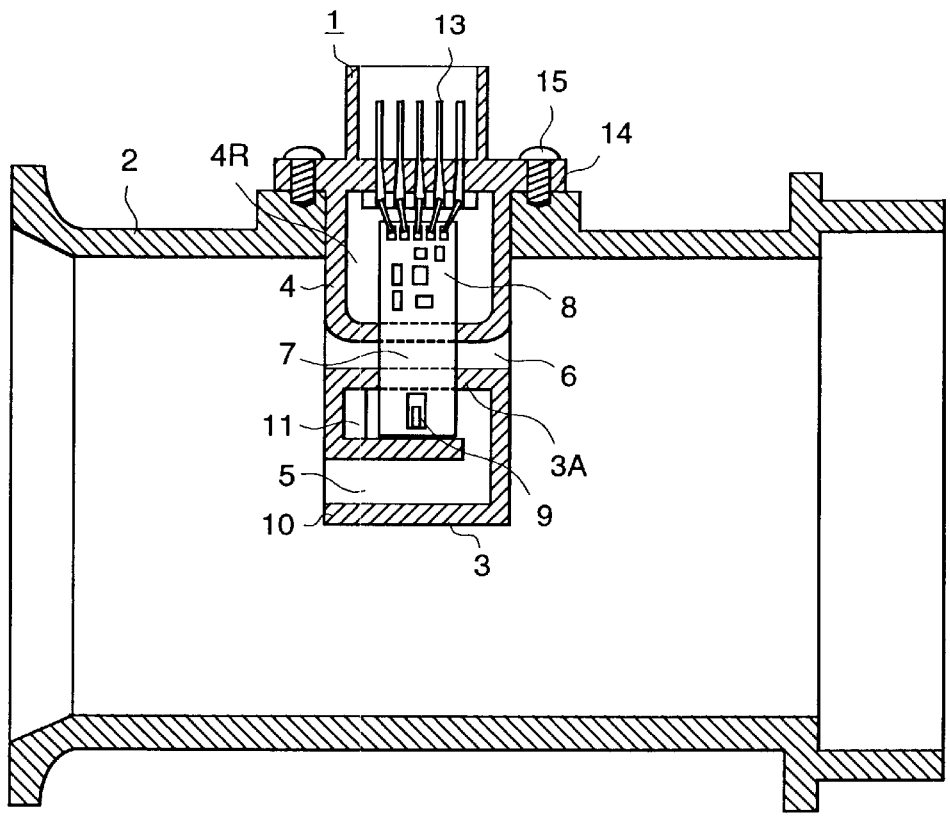
FIG. 5 is a sectional view of thermal type air flow meter according to another embodiment of the present invention.

The embodiment shown in FIG. 5 is different from the embodiment of FIG. 1 in that auxiliary passage 5 formed to auxiliary passage body 3 is in a U-shape.

Also in the embodiment of FIG. 5, the air flowed into the U-shaped auxiliary passage 5 from entrance opening 10 is guided like the U-shape and flowed out from exit opening 11.

Although the air which flows in the U-shaped auxiliary passage 5 cools the other side 7B of supporting substrate 7, the direction of the airflow to cool the other side 7B goes in the opposite direction (i.e., the direction of an antimain flow) to the flow direction of flow path 6 or the main flow direction of main passage body 2. Therefore, the other side 7B of supporting substrate 7 is cooled by two airflows, i.e., the airflow which flows through flow path 6 and the airflow which flows through auxiliary passage 5, which flow directions are different by about ° from each other.

Similarly, upper wall 3A of auxiliary passage body 3 is also cooled by two airflows, the airflow which flows through flow path 6 and the airflow which flows through auxiliary passage 5, which flow directions are different by about 180° from each other.

In the embodiment of FIG. 5 as well as the embodiment shown in FIG. 1 and FIG. 2, supporting substrate 7 is cooled from both sides of the main passage upstream side and the main passage downstream side. Further, upper wall 3A of auxiliary passage body 3 is also cooled from both sides of the main passage upstream side and the main passage downstream side. Since upper wall 3A of auxiliary passage body 3 and supporting substrate 7 are cooled very efficiently, the heat of main passage body 2 and the heat by the self-heating of electronic circuit parts 8 are not easily conducted to flow amount detection elements 9. The measurement error of the flow amount can thereby be reduced, and the flow amount measured with a high degree of accuracy.

Figure 6:
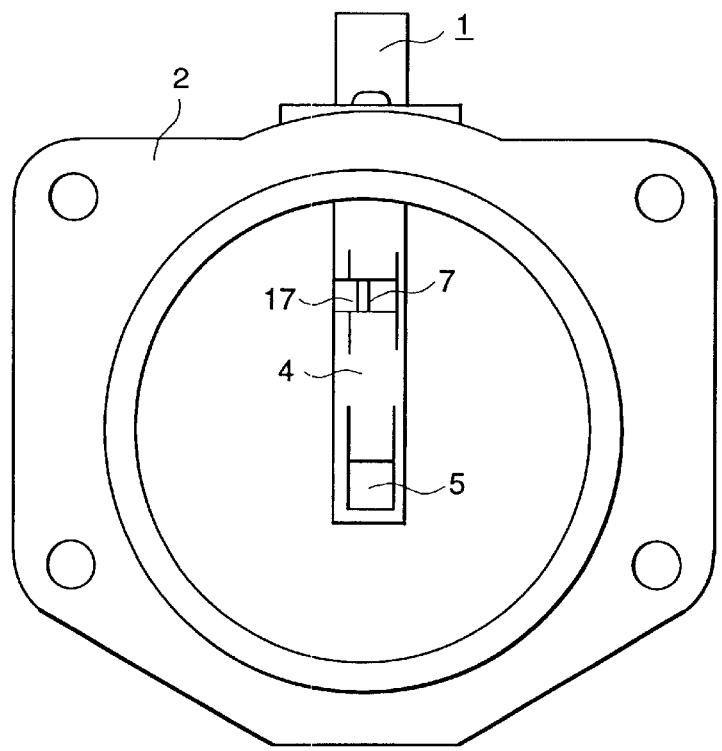
FIG. 6 is a plan view showing a substantial part of another embodiment of the present invention.
Figure 7:
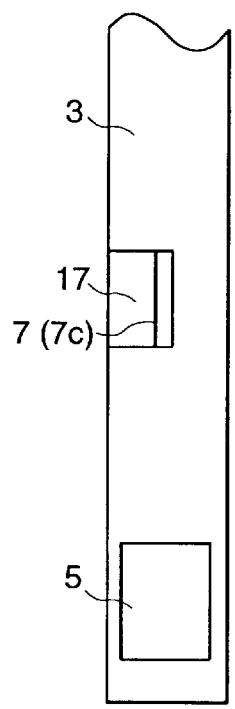
FIG. 7 is a partially broken and enlarged view showing a substantial part of FIG. 6.

A substantial part of a further embodiment of the present invention is shown in FIG. 6 and FIG. 7, in which ditch 17 is formed in auxiliary passage body 3 instead of flow path 6 of FIG. 4 and by which supporting substrate 7 is cooled. Thus, supporting substrate 7 can be cooled by the air in the direction of the main flow of main passage 2 even in this configuration.

Further, because the surface of the other side of ditch 17 can use the accommodation room 4R of housing case 4, and mount electronic circuit parts 8 connected electrically to flow amount detection element 9, the latter can be made even smaller.

Figure 8:
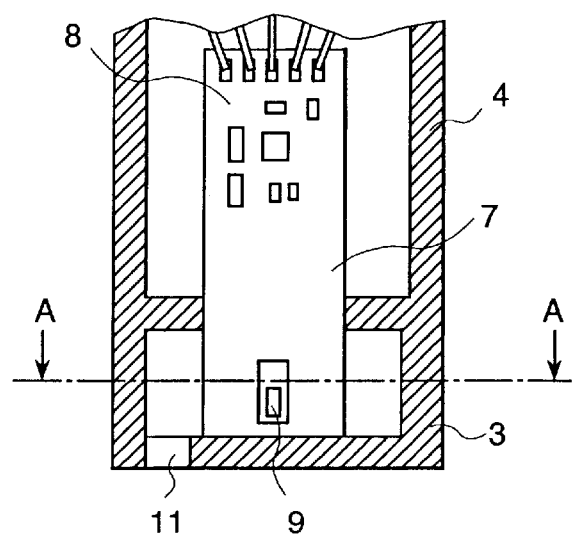
FIG. 8 is a sectional view showing a substantial part of a further embodiment of the present invention.
Figure 9:
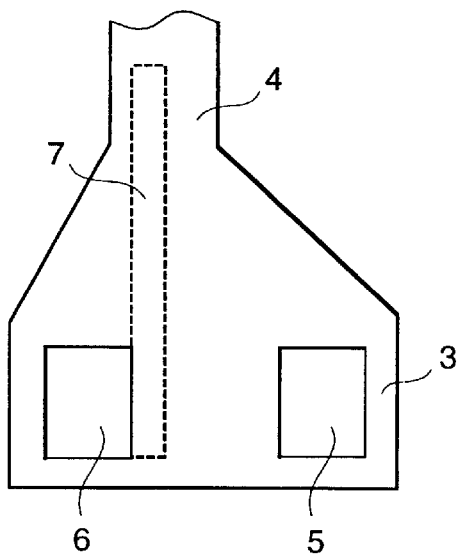
FIG. 9 is a side view of FIG. 8 seen from the direction of the main flow of the main passage.
Figure 10:
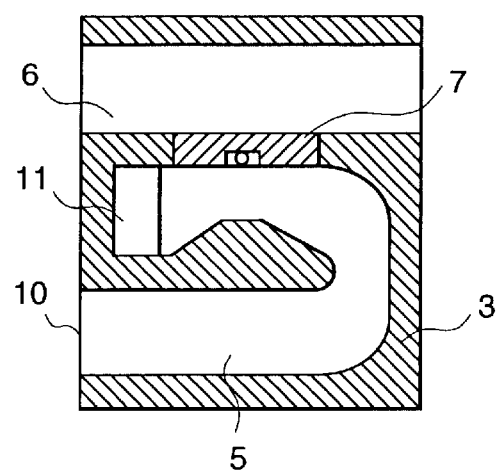
FIG. 10 is a sectional view taken along the line A—A of FIG. 8.

A substantial part of a further embodiment of the present invention is shown in FIG. 8, FIG. 9, and FIG. 10, in which auxiliary passage 5 is formed by providing a curved portion in the same surface, and exit opening 11 is formed under auxiliary passage body 3. Further, flow path 6 is provided at the position adjacent to auxiliary passage 5 of auxiliary passage body 3, and supporting substrate 7 is arranged between auxiliary passage 5 and flow path 6.

In the embodiment of FIG. 8 to FIG. 10, as well as the embodiment shown in FIG. 1 and FIG. 2, supporting substrate 7 is cooled from both sides of the main passage upstream side and the main passage downstream side. Since supporting substrate 7 is cooled efficiently, the heat of main passage body 2 and the heat by the self-heating of electronic circuit parts 8 are not easily conducted to flow amount detection elements 9. Thereby, the measurement error of the flow amount can be reduced, and the flow amount can be measured with a high degree of accuracy.

Because the support member where flow amount detection element including a heating resistor and electronic circuit parts are mounted is cooled from both the direction of the main flow of main passage and the direction of an anti-main flow (i.e., the opposite direction to the direction of the main flow), the present invention accurately measures the flow amount without being influenced by the self-heating of the electronic circuit parts and the heat of the main passage by cooling the route of thermal conduction to the flow amount detection element efficiently.

Although the angle of the direction of an anti-main flow (i.e., the direction opposite to the direction of the main flow) with respect to the direction of the main flow of the main passage is set to about 180° in the above-mentioned embodiment, another angle can be used.

It should also be clearly understood that the housing and the auxiliary passage body can be molded separately instead of being molded integrally.

What is claimed is:

1. A thermal air flow meter having a flow amount detection element including a heating resistor and electronic circuit part mounted on a support member for measuring a flow amount of the fluid which flows in a main passage, comprising:

a first auxiliary passage in which said flow amount detection element is disposed; and a second auxiliary passage for cooling said support member, wherein a flow direction of air in said first auxiliary passage in a portion where said flow amount detection element is opposite to a flow direction of air in said second auxiliary passage.

2. A thermal air flow meter having a flow amount detection element including a heating resistor and electronic circuit part mounted on a support member for measuring the flow amount of the fluid which flows in a main passage, comprising:

a first auxiliary passage in which said flow amount detection element is disposed;

a second auxiliary passage for cooling said support member, wherein a flow direction of air in said first auxiliary passage in a portion where said flow amount detection element is opposite to a flow direction of air in said second auxiliary passage; and a housing portion for accommodating an electronic circuit parts being formed integrally with said first auxiliary passage and said second auxiliary passage.

3. A thermal air flow meter having a flow amount detection element including a heating resistor and electronic circuit part mounted on a support member for measuring the flow amount of the fluid which flows in a main passage, comprising:

a housing accommodating electronic circuit parts mounted on said support member;

a first auxiliary passage in which said flow amount detection element is disposed; and a second auxiliary passage formed between said housing and said first auxiliary passage for cooling said support member, wherein said first auxiliary passage and said second auxiliary passage are arranged such that a flow direction of air in said first auxiliary passage at a portion where said flow amount detection element is disposed is opposite to a flow direction of air in said main passage, and a flow direction of air in said second auxiliary passage is the same as the flow direction of air in said main passage.

4. A thermal air flow meter having a flow amount detection element including a heating resistor and electronic circuit part mounted on a rectangular support member at different positions in longitudinal direction for measuring the flow amount of the fluid which flows in a main passage, comprising:

a housing accommodating electronic circuit parts mounted on said support member;

a first auxiliary passage having a bent portion in which said flow amount detection element is disposed; and a second auxiliary passage for cooling said support member, wherein said first auxiliary passage and said second auxiliary passage are arranged such that a flow direction of air in said first auxiliary passage at said bent portion where said flow amount detection element is disposed is opposite to a flow direction of air in said main passage, and a flow direction of air in said second auxiliary passage is substantially the same as the flow direction of air in said main passage.

5. A thermal air flow meter having a flow amount detection element including a heating resistor and electronic circuit part mounted on a rectangular support member, and mounted on a main passage body for measuring fluid flow rate in said main passage, comprising:

a housing accommodating electronic circuit parts mounted on said support member;

a spiral shape first auxiliary passage in which said flow amount detection element is disposed; and a second auxiliary passage for cooling said support member, wherein said first auxiliary passage and said second auxiliary passage are arranged such that a flow direction of air in said first auxiliary passage at a portion where said flow amount detection element is disposed is opposite to a flow direction of air in said main passage, and a flow direction of air in said second auxiliary passage is substantially the same as the flow direction of air in said main passage.

6. A thermal air flow meter having a flow amount detection element including a heating resistor and electronic circuit part mounted on a rectangular support member, and mounted in an air intake passage of an internal combustion engine for measuring an intake air flow rate, comprising:

a housing accommodating electronic circuit parts mounted on said support member;

a spiral shape first auxiliary passage in which said flow amount detection element is disposed; and a second auxiliary passage for cooling said support member, wherein said first auxiliary passage and said second auxiliary passage are arranged such that a flow direction of air in said first auxiliary passage at a portion where said flow amount detection element is disposed is opposite to a flow direction of air in said main passage, and a flow direction of air in said second auxiliary passage is substantially the same as the flow direction of air in said main passage.

* * * * *